(12) United States Patent
Lashkarian

(10) Patent No.: US 6,678,339 B1
(45) Date of Patent: Jan. 13, 2004

(54) GLOBALLY OPTIMUM MAXIMUM LIKELIHOOD ESTIMATION OF JOINT CARRIER FREQUENCY OFFSET AND SYMBOL TIMING ERROR IN MULTI-CARRIER SYSTEMS

(75) Inventor: Navid Lashkarian, Freemont, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/496,890

(22) Filed: Feb. 2, 2000

(51) Int. Cl.$^7$ .............................. H03D 1/00; H04L 27/06
(52) U.S. Cl. .................. 375/341; 375/262; 375/265; 370/208; 714/708
(58) Field of Search ............................. 375/341, 262, 375/265; 370/208; 714/708

(56) References Cited

U.S. PATENT DOCUMENTS

| | | | | |
|---|---|---|---|---|
| 5,914,931 A | * | 6/1999 | Kang et al. | 370/203 |
| 6,246,723 B1 | * | 6/2001 | Bliss et al. | 375/265 |
| 6,374,216 B1 | * | 4/2002 | Micchelli et al. | 704/236 |
| 6,459,745 B1 | * | 10/2002 | Moose et al. | 375/355 |

* cited by examiner

*Primary Examiner*—Mohammad H. Ghayour
*Assistant Examiner*—Qutub Ghulamali
(74) *Attorney, Agent, or Firm*—Steve Mendelsohn; Ian M. Hughes

(57) ABSTRACT

A method for synchronizing multi-carrier signals in an orthogonal frequency division modulation (OFDM) data transmission system is disclosed which provides maximum likelihood estimation of timing offset and frequency offset. The estimates are able to compensate the estimation error over an entire span of observed data samples. The method requires no training sequence thus enabling blind frequency compensation. The method provides a joint probability density function for the estimates which consists of two terms; one generated from observed data received during a first interval and one generated from observed data received during a second, following, interval. The estimates provided by the method are therefore maximal likelihood over the entire span of observed signals and are a significant improvement over estimates provided by methods based only observations during the first interval. The method is mathematically robust and computationally and statistically efficient. Comparison studies generated by computer simulation graphically display the improved estimates provided by the invention over previous estimation techniques.

8 Claims, 5 Drawing Sheets

FIG. 1
(PRIOR ART)
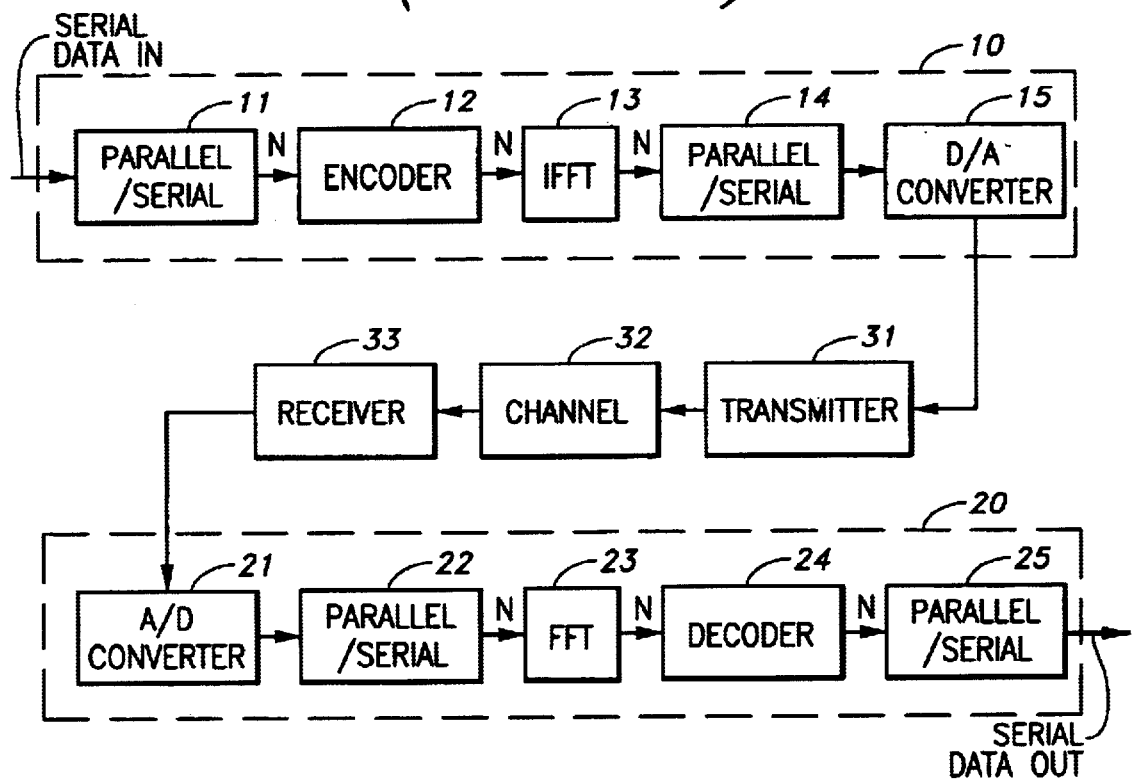
FIG. 2
(PRIOR ART)
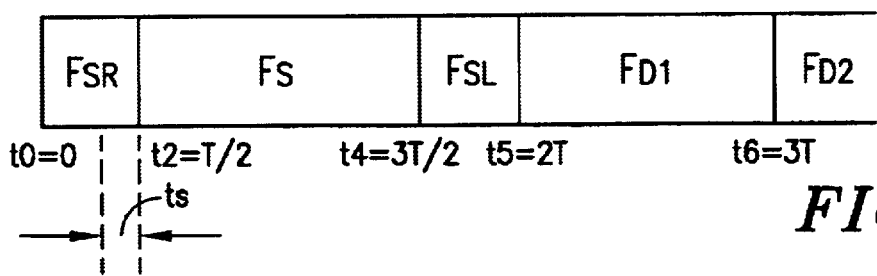
*FIG. 2(a)*
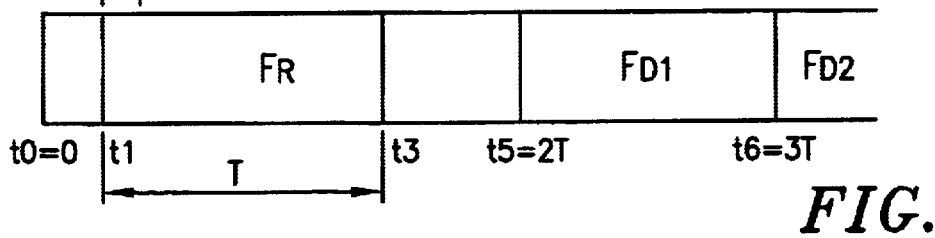
*FIG. 2(b)*

GLOBALLY OPTIMUM MAXIMUM LIKELIHOOD ESTIMATION OF JOINT CARRIER FREQUENCY OFFSET AND SYMBOL TIMING ERROR IN MULTI-CARRIER SYSTEMS

BACKGROUND OF THE INVENTION

1. Field of the Invention

The present invention relates to a method for data communication of signals in units of a frame using an orthogonal frequency division modulation (OFDM) algorithm, and in particular, to a method to find and synchronize the initial frame using a globally optimal maximum likelihood (ML) estimate of joint carrier frequency offset and symbol timing error at the receiver.

2. Description of the Prior Art

OFDM system is a viable modulation scheme for data transmission over time varying dynamic channels. However, it is known that performance of such system is highly susceptible to non-ideal synchronization parameters. Specifically, symbol timing and carrier frequency offset become an increasingly important issue in implementation of OFDM systems for practical applications. It is known that carrier frequency offset deteriorates performance of OFDM systems by introducing interference among the subchannels. To overcome this imperfection, various compensation methods for estimation and correction of synchronization parameters are known in the prior art.

These prior art methods for synchronization of OFDM systems can be classified into two main subclasses, namely minimum mean square error (MMSE) and ML estimators. In MMSE approach, the estimator uses the information provided by the reference signal (pilot tones) in order to minimize a cost function associated with the synchronization parameters. A salient feature of this approach is that no probabilistic assumptions are made with regard to the data. Although MMSE estimators usually result in a tractable (globally stable) and easy to implement realization, no optimal criteria (probabilistic) is associated with these estimators. Also, since part of the transmitted information is allocated to the reference pilots, the bandwidth efficiency of these methods is lower in comparison to the non-pilot schemes.

On the other hand, ML estimators provide the estimate of the unknown parameter subject to minimum probability of error criteria. Although not perfectly efficient, ML estimators are asymptotically minimum variance unbiased (MVU), i.e., their variance attains that of MVU estimator as the length of data record goes to infinity. However, due to the physical constraints, systems with infinitely long data records are not feasible for implementation purposes.

P. H. Moose, in "A Technique for Orthogonal Frequency Division Multiplexing Frequency Offset Correction," IEEE Trans. on Communications, Vol. 42, No. 10, pp. 2098–2913, October 1994, describes the use of a retransmission technique in order to reveal the frequency offset parameter in the likelihood function of the received signal. Due to the redundancy introduced by repeating the data block, the data rate efficiency is decreased by a factor of two. To avoid this imperfection, a ML estimator based on cyclic prefix (CP) is described by J. van de Beek, M. Standel and P. O. Borjesson, in "ML Estimation of Timing and Frequency Offset in OFDM Systems," IEEE Trans. on Signal Processing, Vol. 45, No. 3, pp. 1800–1805, July 1997. In this approach, the side information provided by the CP is used to obtain the likelihood function for joint estimation of symbol timing error and frequency offset in an OFDM system.

The likelihood function described in the Van de Beek reference does not globally characterize the observation vector over the entire range of the timing offset. The ML estimator of the prior art results in a considerable performance loss over finite range of timing offset parameter. More specifically, for a given symbol length, the probability of false ML estimation approaches one as the length of cyclic prefix increases.

Currently, there is increasing interest in multi-carrier modulation (MCM) for dividing a communication channel into several subchannels and transmitting many subcarriers through a single band using frequency division multiplexing (FDM) techniques. In the MCM method, however, because several subcarriers occupying a narrow frequency domain are transmitted at one time, a relatively longer symbol period results compared with a single carrier modulation method. The MCM method has, owing to such characteristics, the advantages that equalization is easily performed and that it has immunity to impulse noise. OFDM is a type of the MCM designed to maximize the working frequency efficiency by securing orthogonality among the multiplexed subcarriers. OFDM is applied to mobile radio channels to attenuate multipath fading.

In an OFDM transmitting/receiving system, modulation and demodulation of parallel data are carried out using the Fast Fourier Transform (FFT). It is required that the sampled data be sent in predetermined frames, having passed through a FFT routine, been time-division multiplexed, and transmitted, then restored at the receiving end. However, if the synchronization is in error in the course of restoring the frame, the signals demodulated after the FFT will be influenced by interchannel and intersymbol interference. Accordingly, the problem of synchronization in reforming the frame, especially any joint carrier frequency offset or symbol timing error, must be addressed as a matter of importance.

Conventional synchronization methods as above-described encounter problems in that the process of synchronization is not only very complex, but the synchronization is not realized rapidly.

SUMMARY OF THE INVENTION

Accordingly, the present invention is directed at a synchronization method that substantially obviates on or more of the problems due to limitations and disadvantages of the prior art.

Additional features and advantages of the invention will be set forth in the description which follows, and in part will be apparent from the description, or may be learned by practice of the invention. The objectives and other advantages of the invention will be realized and attained by the methods particularly pointed out in the written description and claims hereof, as well as the appended drawings.

To achieve these and other advantages, and in accordance with the purpose of the invention as embodied and broadly described, there is provided a method of estimating joint carrier frequency and symbol timing errors in a received sample bit stream including an observation vector (OV), having an observed carrier frequency timing offset $\epsilon$, and a plurality of data-symbol frames, having an observed symbol timing error $\theta$. The method comprises the steps of generating a probability density function (PDF) based on the OV, and generating from the PDF a joint maximum likelihood (ML) estimate of a joint carrier frequency offset and a symbol timing error, the maximization performed globally over the entire span of the estimation vector $[\epsilon, \theta]$. In another aspect of the invention, wherein the OV comprises an L-bit cyclic extension portion and a first and a second N-bit synchronization frame, the method calls for the PDF to comprise a first term, p1, based on the observed timing error $\theta$ being within the span 1 to N and a second term, p2, based on the observed timing error $\theta$ being within the span N+1 to N+L.

In yet another aspect of the method wherein the received bit stream has uncorrelated independent identically distributed random signal and noise sequence variables with power of $\sigma_s^2$ and $\sigma_n^2$, respectively, and wherein the OV is denoted x, the PDF is given by $$p(x,\epsilon,\theta)=p_1(x,\epsilon,\theta)(U[\theta-1]-U[\theta-N-1])+p_2(x,\epsilon,\theta)(U[\theta-N-1]-U[\theta-N-L+1])$$

wherein U[n] is the discrete time unit step function, and wherein
if $(1 \leq \theta \leq N)$ $$R = \begin{bmatrix} r_{xx}[0]I_{(\vartheta)} & 0 & 0 \\ 0 & T_{(N+L)} & 0 \\ 0 & 0 & r_{xx}[0]I_{(N-\vartheta)} \end{bmatrix}$$

$$R^{-1} = \begin{bmatrix} \dfrac{I_{(\vartheta)}}{r_{xx}[0]} & 0 & 0 \\ 0 & T_{(N+L)}^{-1} & 0 \\ 0 & 0 & \dfrac{I_{(N-\vartheta)}}{r_{xx}[0]} \end{bmatrix}$$

$$T_M \stackrel{\Delta}{=} \text{Toeplitz}\ (r_{xx}[0]\ r_{xx}[1] \ldots r_{xx}[M-1])$$

$$r_{xx}[m] \stackrel{\Delta}{=} (\sigma_s^2+\sigma_n^2)\delta[m]+\sigma_s^2 e^{-j2\pi\epsilon}\delta[m-N]$$

$$T_{(M)}^{-1}[i,j] = \begin{cases} \dfrac{1}{r_{xx}[0](1-[a]^2)} & i=j\ \&\ (1 \leq i \leq M-N\ \text{or}\ N+1 \leq i \leq M) \\ \dfrac{-a^*}{r_{xx}[0](1-|a|^2)} & i-j = N \\ \dfrac{-a}{r_{xx}[0](1-|a|^2)} & j-i = N \\ \dfrac{1}{r_{xx}[0]} & i-j\ \&\ M-N+1 \leq i \leq N \\ 0 & \text{otherwise} \end{cases}$$

where $a \stackrel{\Delta}{=} \dfrac{e^{-j2\omega\pi}\sigma_s^2}{\sigma_s^2+\sigma_n^2}$ $$P_1(x,\epsilon,\vartheta) = \frac{1}{(2\pi)^{2N+L}\det(R)}\exp\left[\frac{-1}{2(\sigma_s^2+\sigma_n^2)}\left(\sum_{k=0}^{2N+L-1}|x[k]|^2 + \sum_{k=0}^{L+\vartheta-1}(|x[k]|^2+|x[k+N]|^2)\frac{[a]^2}{1-[a]^2} - 2\Re\left\{\sum_{k=\vartheta}^{\vartheta+L-1}x^*[k]x[k+N]\frac{a^*}{1-|a|^2}\right\}\right)\right],\ \text{or}$$

if $(N+1 \leq \theta \leq N+L)$.

$$R = \begin{bmatrix} T_{(s)} & 0 \\ 0 & T_{(2N+L-\vartheta)} \end{bmatrix}$$

$$P_2(x,\epsilon,\vartheta) = \frac{1}{(2\pi)^{2N+L}\det(R)}\exp\left\{\frac{-1}{2(\sigma_s^2+\sigma_n^2)}\left(\sum_{k=0}^{2N+L-1}|x[k]|^2 + \left(\sum_{k=0}^{\vartheta-N-1}|x[k]|^2+|x[k+N]|^2 + \sum_{k=\vartheta}^{N+L-1}|x[k]|^2+|x[k+N]|^2\right)\frac{a^*}{1-|a|^2} - 2\Re\left\{\sum_{k=0}^{\vartheta-L-1}x^*[k]x[k+N]\frac{a^*}{1-|a|^2}\right\} - 2\Re\left\{\sum_{k=\vartheta}^{N+L-1}x^*[k]x[k+N]\frac{a^*}{1-|a|^2}\right\}\right)\right\},\ \text{and}$$

wherein the ML estimate of symbol timing error is given by $$\vartheta_{ML} = \underset{\vartheta}{\arg\max}\, T_2(\vartheta)|a| + 2|T_1(\vartheta)|$$

and wherein the ML estimate of carrier frequency offset is given by $$\epsilon_{ML} = \frac{-1}{2\pi}\angle T_1(x,\vartheta),$$

where $$T_{1(\chi,\vartheta)} = \begin{cases} \sum_{k=\vartheta}^{L+\vartheta-1} x[k]x^*[k+N] & 1 \leq \vartheta \leq N \\ \sum_{k=0}^{\vartheta-N-1} x[k]x^*[k+N] + \\ \sum_{k=\vartheta}^{N+L-1} x[k]x^*[k+N] & N+1 \leq \vartheta \leq N+L \end{cases}$$

and $$T_2(\chi,\vartheta) = \begin{cases} \sum_{k=\vartheta}^{L+\vartheta-1} |x[k]|^2 + |x[k+N]|^2 & 1 \leq \vartheta \leq N \\ \sum_{k=0}^{\vartheta-N-1} |x[k]|^2 + |x^*[k+N]|^2 + \\ \sum_{k=\vartheta}^{N+L-1} |x[k]|^2 + |x[k+N]|^2 & N+1 \leq \vartheta \leq N+L \end{cases}$$

A method of synchronizing a received sample bit stream is also provided by the invention, comprising the steps of transmitting at a transmitter the bit stream including an observation vector (OV), receiving and sampling at a receiver the bit stream, which includes the OV with an observed carrier frequency timing offset $\epsilon$, and a plurality of data-symbol frames, having an observed symbol timing error $\theta$, generating a probability density function (PDF) based on the OV, generating from the PDF a joint maximum likelihood (ML) estimate of a joint carrier frequency offset and a symbol timing error, the maximization performed globally over the entire span of the estimation vector $[\epsilon,\theta]$, and synchronizing the received bit stream by the ML estimates of carrier frequency offset and symbol timing error.

In another aspect of the synchronization method provided by the invention wherein the OV comprises an L-bit cyclic extension portion and a first and a second N-bit synchronization frame, the PDF comprises a first term, p1, based on the observed timing error $\theta$ being within the span 1 to N and a second term, p2, based on the observed timing error $\theta$ being within the span N+1 to N+L.

In yet another aspect of the synchronization method provided by the invention, wherein the received bit stream has uncorrelated independent identically distributed random signal and noise sequence variables with power of $\sigma_s^2$ and $\sigma_n^2$, respectively, and wherein the OV is denoted x, the PDF is given by $$p(x,\epsilon,\theta)=p_1(x,\epsilon,\theta)(U[\theta-1]-U[\theta-N-1])+p_2(x,\epsilon,\theta)(U[\theta-N-1]-U[\theta-N-L+1])$$

wherein U[n] is the discrete time unit step function, and wherein
if $(1 \leq \theta \leq N)$ $$R = \begin{bmatrix} r_{xx}[0]I_{(\theta)} & 0 & 0 \\ 0 & T_{(N+L)} & 0 \\ 0 & 0 & r_{xx}[0]1_{(N-\theta)} \end{bmatrix}$$

$$R^{-1} = \begin{bmatrix} \dfrac{I_{(\theta)}}{r_{xx}[0]} & 0 & 0 \\ 0 & T_{(N+L)}^{-1} & 0 \\ 0 & 0 & \dfrac{I_{(N-\theta)}}{r_{xx}[0]} \end{bmatrix}$$

$T_M \stackrel{\Delta}{=} \text{Toeplitz}\ (r_{xx}[0]\ r_{xx}[1]\ \ldots\ r_{xx}[M-1]$ $r_{xx}[m] \stackrel{\Delta}{=} (\sigma_s^2+\sigma_n^2)\delta[m]+\sigma_s^2 e^{-j2\pi\epsilon}\delta[m-N]$ $T_{(M)}^{-1}[i,j] =$ $$\begin{cases} \dfrac{1}{r_{xx}[0](1-[a]^2)} & i=j\ \&\ (1 \leq i \leq M-N\ \text{or}\ N+1 \leq i \leq M) \\ \dfrac{-a^*}{r_{xx}[0](1-|a|^2)} & i-j=N \\ \dfrac{-a}{r_{xx}[0](1-|a|^2)} & j-i=N \\ \dfrac{1}{r_{xx}[0]} & i-j\ \&\ M-N+1 \leq i \leq N \\ 0 & \text{otherwise} \end{cases}$$

where $a \stackrel{\Delta}{=} \dfrac{e^{-j2\pi\epsilon}\sigma_s^2}{\sigma_s^2+\sigma_n^2}$ $$P_1(x,\varepsilon,\vartheta) = \dfrac{1}{(2\pi)^{2N+L}\det(R)}\exp\left[\dfrac{-1}{2(\sigma_s^2+\sigma_n^2)}\left(\sum_{k=0}^{2N+L-1}|x[k]|^2 + \right.\right.$$

$$\sum_{k=\vartheta}^{L+\vartheta-1}(|x[k]|^2+|x[k+N]|^2)\dfrac{[a]^2}{1-[a]^2} -$$

$$\left.\left.2\mathcal{R}\left\{\sum_{k=\vartheta}^{\vartheta+L-1}x^*[k]x[k+N]\dfrac{a^*}{1-|a|^2}\right\}\right)\right],$$

or if $(N+1 \leq \vartheta \leq N+L)$ $$R = \begin{bmatrix} T_{(\vartheta)} & 0 \\ 0 & T_{(2N+L-\vartheta)} \end{bmatrix}$$

$$P_2(x,\varepsilon,\vartheta) = \dfrac{1}{(2\pi)^{2N+L}\det(R)}\exp\left[\dfrac{-1}{2(\sigma_s^2+\sigma_n^2)}\left(\sum_{k=0}^{2N+L-1}|x[k]|^2 + \right.\right.$$

$$\sum_{k=\vartheta}^{\vartheta-N-1}|x[k]|^2+|x[k+N]|^2 +$$

$$\sum_{k=\vartheta}^{N+L-1}|x[k]|^2+|x[k+N]|^2\bigg)\dfrac{[a]^2}{1-[a]^2} - 2\mathcal{R}\left\{\sum_{k=0}^{\vartheta+N-1}x^*[k]x[k+N]\dfrac{a^*}{1-|a|^2}\right\} -$$

$$\left.\left.2\mathcal{R}\left\{\sum_{k=\vartheta}^{N+L-1}x^*[k]x[k+N]\dfrac{a^*}{1-|a|^2}\right\}\right)\right],$$

and wherein the ML estimate of symbol timing error is given by $$\vartheta_{ML} = \arg\max\ T_x(\vartheta)|a| + 2|T_1(\vartheta)|$$

and wherein the ML estimate of carrier frequency offset is given by $$\varepsilon_{ML} = \dfrac{-1}{2\pi}\angle T_1(x,\vartheta),$$

where $$T_{1(\chi,\vartheta)} = \begin{cases} \displaystyle\sum_{k=\vartheta}^{L+\vartheta-1} x[k]x^*[k+N] & 1 \leq \vartheta \leq N \\ \displaystyle\sum_{k=0}^{\vartheta-N-1} x[k]x^*[k+N] + \sum_{k=\vartheta}^{N+L-1} x[k]x^*[k+N] & N+1 \leq \vartheta \leq N+L \end{cases}$$ and $$T_{2(\chi,\vartheta)} = \begin{cases} \displaystyle\sum_{k=\vartheta}^{L+\vartheta-1} |x[k]|^2 + |x[k+N]|^2 & 1 \leq \vartheta \leq N \\ \displaystyle\sum_{k=0}^{\vartheta-N-1} |x[k]|^2 + |x[k+N]|^2 + \sum_{k=\vartheta}^{N+L-1} |x[k]|^2 + |x[k+N]|^2 & N+1 \leq \vartheta \leq N+L \end{cases}$$

BRIEF DESCRIPTION OF THE DRAWINGS

FIG. 1 is a block diagram of a transmitting/receiving system using orthogonal frequency division modulation (OFDM).

FIG. 2 illustrates the frame structure of the initial frame synchronization of the OFDM system of FIG. 1; FIG. 2A showing transmitted an appended synchronization half-frame FSL preceding and an appended synchronization half-frame FSR following the synchronizing frame FS and FIG. 2B showing received a frame FR having undergone an offset θ.

DETAILED DESCRIPTION OF A PREFERRED EMBODIMENT

Figure 3:
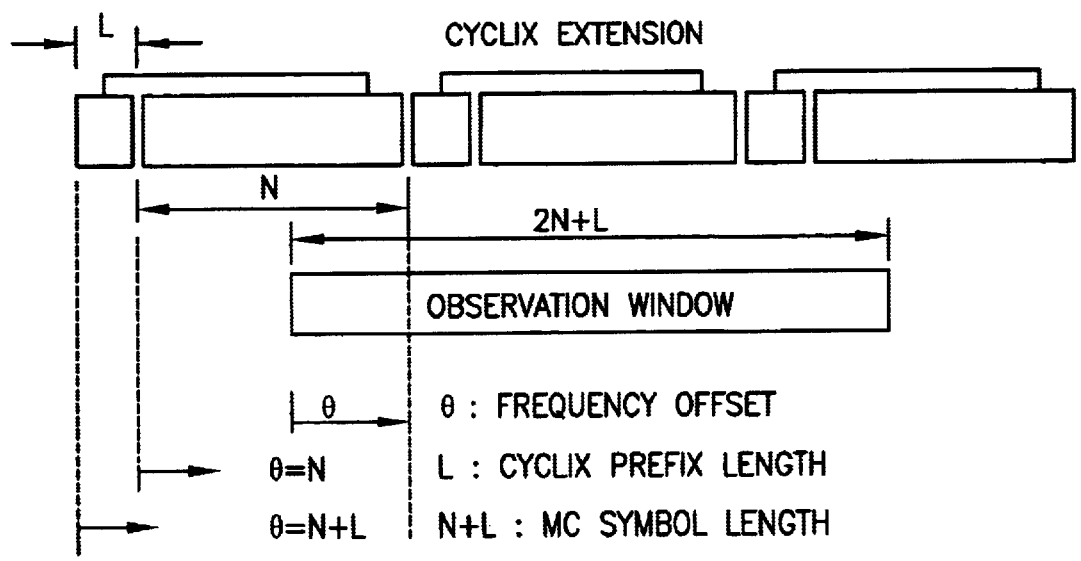
FIG. 3 illustrates received-frame structure of the initial frame synchronization method of the present invention.

The object of the present invention is to provide a maximum likelihood function for joint estimation of carrier frequency offset and symbol timing error of OFDM systems. Based on this object, another object of the present invention is to provide a new optimum ML estimator for the joint estimation problem. The invention provides a blind synchronization method not requiring a training sequence or pilot tones. The method employs a global formulation of the estimation problem; the resulting ML estimator does not suffer from the sub-optimum performance of conventional ML techniques. The method of the instant invention is statistically and computationally efficient making the method efficient in practical applications. The disclosed method, while described in terms of the synchronization of a multi-carrier system including ODFM, could be applied to discrete multi-tone (DMT) systems, or, in fact, any modulation technique which exploits cyclic extension in transmitting data.

For the purpose of the synchronization method of the instant invention, the transmitting step sends two frames consisting of the bit streams known already in the bit stream preamble, and the receiving step takes only one frame from such two frames to find a synchronization offset by a variation of phase. Additionally, a predetermined number of bits from the end of each transmitted block are repeated at the beginning of the next block transmitted. But instead of using a ML estimator based on the side information provided by this cyclic prefix, a global likelihood function for joint estimation of timing and frequency, of the instant invention, provides the ML estimator of the instant invention based on a probability density function (PDF) according to the instant invention. This PDF incorporates a second term over that known in the prior art which results in a ML which more fully characterizes the random observations over the entire range of the timing offset parameter. Once this PDF is derived, it is employed to find estimates of the carrier frequency offset maximizing this PDF by applying the ML estimation method to the PDF. An estimate of the data symbol timing error is similarly determined. A performance assessment of the ML estimator of the instant invention has been achieved by means of monte carlo computer simulations.

Accordingly, a class of a globally optimum non data-aided cyclic based robust estimators for frequency offset estimation of MC systems and a maximum likelihood function for joint estimation of symbol timing error and carrier frequency offset in MC systems is disclosed and is used for deriving a maximum likelihood estimator for the joint estimation problem. A principal object of the ML estimator of the instant invention over the prior art is in its improved ability to compensate the estimation error over an entire span of observed data samples received. Once these offset and timing errors are estimated according to the instant invention, it is possible to compensate the received signals to achieve synchronization, as is known to those skilled in the art.

With reference to FIG. 1, an orthogonal frequency division modulation (OFDM) transmitting/receiving system 10 consists of a serial/parallel converter 11 for converting input serial data into parallel data, an encoder 12 for encoding the output signals of the serial/parallel converter 11, an inverse Fast Fourier Transform (IFFT) converter 13 implementing the inverse fast Fourier transform of the output signals from an encoder 12, a parallel/serial converter 14 for converting the output signals of the IFFT converter 13 into analog signals, and a digital-analog converter 15 converting the output data of the parallel/serial converter 14 into analog signals, while the orthogonal frequency division multiplexing demodulator 20 comprises an analog/digital converter 21 inputting the output signals of the (OFDM) modulator 10 through a transmitter 31, channels for transmission 32 and a receiver 33, and converting them into digital signals, a serial/parallel converter 22 converting the output signals of the analog/digital converter 21 into parallel data, a FFT converter 23 for implementing a FFT of the output signals of the serial/parallel converter 22, a decoder 24 for decoding the output signals of the FFT converter 23, and a parallel/serial converter 25 for converting the parallel data output by the decoder 24 into serial data.

The frame structure of the data transmitted/received by OFDM system 10 of FIG. 1, is illustrated in FIG. 2. With reference to FIG. 2A showing transmitted-frame structure, a frame FS and the half frames FSR and FSL appended at each side of the frame FS are the frames for initial synchronization, and the subsequent frames FD1,FD2, . . . are message data frames. The frame FSR for initial synchronization, corresponding to a half frame, is a duplicate of the right half of frame FS, and the frame FSL for initial synchronization, is a duplicate of the left half of FS. The time reference designators T, ts, and θ denote in FIG. 2A the frame symbol time, the sampling interval, and the number of shifted sample points corresponding to the synchronization timing offset, respectively. With reference now to FIG. 2B, showing received-frame structure, at the beginning of the synchronization operation, the continuous frame Fk at time T is taken from among the frames FSL, FS, FSR in the preamble for the initial synchronization of the frame. Accordingly, the frame Fk is located between the times to and ts. The synchronization offset θ has an absolute value, $abs(θ) \leq N/2$, where N is the number of samples per frame. The synchronization time t5 of the frame in FIG. 2B may be found then by estimating the synchronization offset value, as will be described hereinafter, in accordance with the present invention. In the case where there is a frame synchronization offset as much as the time θ*ts, that is an θ sample in the received signal, the phase of the kth subcarrier will be shifted, resulting in a symbol timing error.

To describe the cyclic-based estimation method for synchronization of the instant invention, the frame structure of FIG. 2 is further modified as shown in FIG. 3. Due to the inter-symbol interference introduced by non-ideal channels, the OFDM symbols are subject to the inter-block interference (IBI) among consecutive transmitted blocks, which results in considerable performance degradation in an OFDM system. To mitigate this effect, the last L input samples in each input block of length N are repeated at the beginning of the block. This makes the input sequence look periodic and clears the channel memory at the end of each input block making the successive OFDM symbols independent. The OFDM received signal is denoted by $$y[n] = s[n - \vartheta] \exp^{j\frac{2\pi n \vartheta}{N}} + w[n] \quad (1)$$

where s[.] is the transmitted sequence and w is the additive white Gaussian noise (AWGN). Both signal and noise sequences are assumed to be uncorrelated independent identically distributed (iid) random variables with power of $\sigma_s^2$ and $\sigma_n^2$, respectively. Also, ε and θ are the synchronization frequency offset and symbol timing error introduced by the synchronization mismatch in the carrier frequency and symbol timing, respectively. Let x=[x[0] . . . x[2N+L−1]] be a vector of 2N+L previously received samples at time n, known as observation vector. With the above notation, the kth entry of this vector can be represented as x[k]=y[n−2N−L+1+k]. Length of this vector is selected such that there are at least L correlated symbols associated in the observation vector (OV) regardless of the synchronization parameters. Due to the timing offset error θ at the receiver, the starting point of this vector is shifted by θ samples with respect to the beginning of the OFDM symbol block.

Under the iid assumption for both signal and noise, the autocorrelation function for the observation vector x can be expressed by $$E\{x[k]x^*[k+m]\} = \begin{cases} \sigma_t^2 + \sigma_n^2 & m = 0 \\ \sigma_t^2 e^{-j2mc} & m = N, k \in \Omega \\ 0 & \text{otherwise} \end{cases} \quad (2)$$

where $\Omega = \{k \in N: \theta \leq k \leq \theta + L - 1\}$ is the cyclic set associated with the observation vector. Assuming an AWGN scenario, the probability density function (PDF) of the observation vector is in the form of $$p(x, \vartheta, \varepsilon) = \frac{1}{(2\pi)^{2N+L} \det(R)} \exp[x^* R^{-1} x] \quad (3)$$

where R is the autocorrelation matrix of the observation vector. In the van de Beek, et al reference the authors use the Bayes theorem in order to obtain the PDF of the observation vector. However, as is shown next, the resulting likelihood measure does not fully characterize the random observation vector x over the entire range of the timing offset parameter. The likelihood function of the present invention which removes this imperfection is now disclosed.

The question of the optimal choice of likelihood function for joint estimation of frequency and timing offset in OFDM systems is presented next. The analysis for computing the PDF is based on the standard matrix inversion approach. Depending on the timing offset parameter θ, the autocorrelation matrix (R) can be cast into one of the following forms.

A. Case I ($1 \leq \theta \leq N$)

In this case, there are two cyclic sets associated with the observation vector. This would partition the autocorrelation matrix and its inverse into the following forms $$R = \begin{bmatrix} r_{xx}[0] I_{(\vartheta)} & 0 & 0 \\ 0 & T_{(N+L)} & 0 \\ 0 & 0 & r_{xx}[0] I_{(N-\vartheta)} \end{bmatrix} \quad (4)$$

$$R^{-1} = \begin{bmatrix} \frac{I_{(\vartheta)}}{r_{xx}[0]} & 0 & 0 \\ 0 & T_{(N+L)}^{-1} & 0 \\ 0 & 0 & \frac{I_{(N-\vartheta)}}{r_{xx}[0]} \end{bmatrix} \quad (5)$$

where $T_{(M)}$ is a tridiagonal Toepliz matrix of size M as expressed by $$T_M \triangleq \text{Toeplitz} (r_{xx}[0] \ r_{xx}[1] \ldots r_{xx}[M-1]) \quad (7)$$

The argument inside the Toeplitz operator is the first row of the Toeplitz matrix $R_{(\delta)}$ with $$r_{xx}[m] \triangleq (\sigma_s^2 + \sigma_n^2)\delta[m] + \sigma_s^2 e^{-j2\pi\varepsilon}\delta[m-N] \quad (8)$$

Due to the tridiagonal Toeplitz property of the matrix $T_{(M)}$, the [i, j]$^{th}$ entry of its inverse can be obtained from $$T_{(M)}^{-1}[i, j] = \begin{cases} \frac{1}{r_{xx}[0](1 - [a]^2)} & i = j \ \&(1 \leq i \leq M - N \text{ or } N + 1 \leq i \leq M) \\ \frac{-a^*}{r_{xx}[0](1 - |a|^2)} & i - j = N \\ \frac{-a}{r_{xx}[0](1 - |a|^2)} & j - i = N \\ \frac{1}{r_{xx}[0]} & i - j \ \& M - N + 1 \leq i \leq N \\ 0 & \text{otherwise} \end{cases} \quad \text{where} \quad (9)$$

$$a \triangleq \frac{e^{-j2\pi} \sigma_n^2}{\sigma_n^2 + \sigma_n^2} \quad (10)$$

Substituting equations (9) and (5) into (3), and after some algebraic manipulation, the conditional PDF for this case can be expressed as $$P_1(x, \varepsilon, \vartheta) = \frac{1}{(2\pi)^{2N+L}\det(R)} \exp\left[\frac{-1}{2(\sigma_n^2 + \sigma_n^2)}\left(\sum_{k=0}^{2N+L-1} |x[k]|^2 + \sum_{k=\vartheta}^{L+\vartheta-1}(|x[k]|^2 + |x[k+N]|^2)\frac{[a]^2}{1-[a]^2} - 2R\left\{\sum_{k=\vartheta}^{\vartheta+L-1} x^*[k]x[k+N]\frac{a^*}{1-|a|^2}\right\}\right)\right], \quad (11)$$

where R is the real operator.

B. Case II (N+1≦θ≦N+L)

In this case, there are three cyclic sets associated with the observation vector and the autocorrelation matrix is partitioned into two tridiagonal toeplitz matrices as express by $$R = \begin{bmatrix} T_{(\vartheta)} & 0 \\ 0 & T_{(2N+L-\vartheta)} \end{bmatrix} \quad (12)$$

Substituting equation (12) into (3), and using (9) the conditional PDF for this case can be written $$P_2(x, \varepsilon, \vartheta) = \frac{1}{(2\pi)^{2N+L}\det(R)} \exp\left[\frac{-1}{2(\sigma_n^2 + \sigma_n^2)}\left(\sum_{k=0}^{2N+L-1} |x[k]|^2 + \right.\right. \quad (13)$$

$$\left(\sum_{k=0}^{\vartheta-N-1} |x[k]|^2 + |x[k+N]|^2 + \sum_{k=\vartheta}^{N+L-1} |x[k]|^2 + |x[k+N]|^2\right)$$

-continued $$\frac{[a]^2}{1-|a|^2} - 2R\left\{\sum_{k=0}^{\vartheta-N-1} x^*[k]x[k+N]\frac{a^*}{1-|a|^2}\right\} -$$

$$2R\left\{\sum_{k=\vartheta}^{N+L-1} x^*[k]x[k+N]\frac{a^*}{1-|a|^2}\right\}\right]$$

Combining this with (11), we conclude that the PDF which globally characterizes the observation vector can be expressed as $$p(x,\varepsilon,\theta) = p_1(x,\varepsilon,\theta)(U[\theta-1]-U[\theta-N-1]) + p_2(x,\varepsilon,\theta)(U[\theta-N-1]-U[\theta-N-L+1]) \quad (14)$$

where U[n] is the discrete time unit step function. We conclude this section by noting that the PDF given in the van de Beek, et al reference is only the first term of the PDF given in (14).

An ML estimator for joint estimation of carrier frequency and symbol timing error is then derived. The ML estimate for the unknown vector [ε,θ] is defined to be the vector $[\varepsilon_{ML},\theta_{ML}]$ that maximizes the p(x,ε,θ) for fixed realization of the random vector x as expressed by $$[\varepsilon_{ML}, \vartheta_{ML}] = \underset{\varepsilon,\vartheta}{\arg\max}\, p(x, \varepsilon, \vartheta)$$

The maximization is performed over the entire span of the estimation vector [ε,θ]. By taking the derivative of the likelihood function given in (14), it can be shown that the joint ML estimation of θ and ε becomes $$\vartheta_{ML} = \underset{\vartheta}{\arg\max}\, T_2(\vartheta)|a| + 2|T_1(\vartheta)| \quad (15)$$

$$\varepsilon_{ML} = \frac{-1}{2\pi}\angle T_1(x, \vartheta) \quad (16)$$

$$T_1(\zeta, \vartheta) = \begin{cases} \sum_{k=\vartheta}^{L+\vartheta-1} x[k]x^*[k+N] & 1 \leq \vartheta \leq N \\ \sum_{k=0}^{\vartheta-N-1} x[k]x^*[k+N] + \sum_{k=\vartheta}^{N+L-1} x[k]x^*[k+N] & N+1 \leq \vartheta \leq N+L \end{cases} \quad (17)$$

$$T_2(\zeta, \vartheta) = \quad (18)$$

$$\begin{cases} \sum_{k=\vartheta}^{L+\vartheta-1} |x[k]|^2 + |x[k+N]|^2 & 1 \leq \vartheta \leq N \\ \sum_{k=0}^{\vartheta-N-1} |x[k]|^2 + |x[k+N]|^2 + \sum_{k=\vartheta}^{N+L-1} |x[k]|^2 + |x[k+N]|^2 & N+1 \leq \vartheta \leq N+L \end{cases}$$

Figure 4:
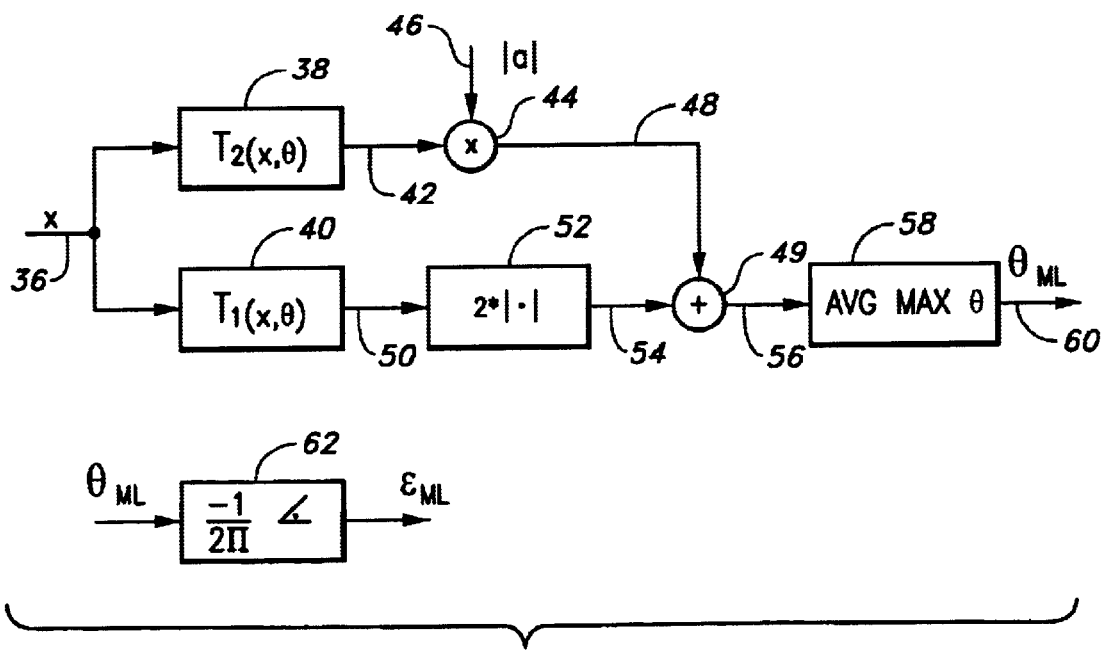
FIG. 4 is a block diagram representation of the ML estimators of the present invention.

With reference now to FIG. 4, a block diagram shows the processing of an observation vector x according to the present invention. Signals representing x are conducted via path 36 to a block 38 representing the $T_2(x,\theta)$ function given by Equation (18) and to a block 40 representing the $T_1(x,\theta)$ function given by Equation (17). The result of processing x by block 38 is conducted on a path 42 to a multiplier block 44 which also receives the noise signal represented by |α|, α being the assumed noise signal defined in equation (10) on a path 46. The resulting product is generated on a path 48 to a summer 49.

The result of processing x by block 40 is conducted on a path 50 to a block 52 which performs an absolute value function on $T_1(x,\theta)$ and a multiplication by 2 on the absolute value. The result is conducted on a path to summer 49. The sum of signals on paths 48 and 54 is formed on path 56 and conducted to block 58 which performs thereon the arg max over θ function. The result $\theta_{ML}$ is generated on a path 60, thereby generating the frequency offset estimator signal according to equation (15) of the present invention. Again with reference to FIG. 4, the $\theta_{ML}$ signal is conducted to a block 62 where the radius phase angle of $\theta_{ML}$ calculated thereby generating the symbol timing estimator signal according to equation (16) of the present invention.

Figure 5:
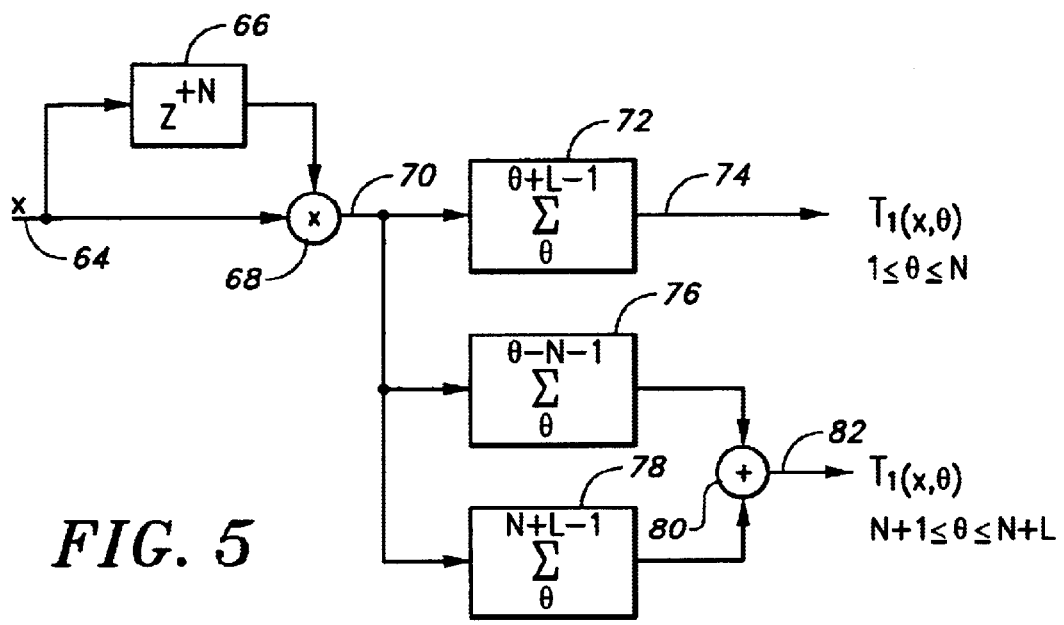
FIG. 5 is a block diagram representation of the $T_1$ function provided by the present invention.

With reference now to FIG. 5, a block diagram shows the processing of an observation vector x according to the present invention to generate the $T_1(x,\theta)$ function shown in block 40 of FIG. 4. Signal representing x are conducted on a path 64 to a block 66 and a block 68 performing the autocorrelation operation for the observation vector x as required by equation (17). The result is generated on a pth 70 and conducted to a summation block 72 for summation over the interval $1 \leq \theta \leq N$ for output on a path 74 whereby the function $T_1(x,\theta)$ is generated for this interval.

The signal on path 70 is also conducted to blocks 76 and 78 where it similarly produced signals conducted to a summer 80 which generates on a path 82 for the function $T_1(x,\theta)$ for the interval $N+1 \leq \theta \leq N+L$.

Figure 6:
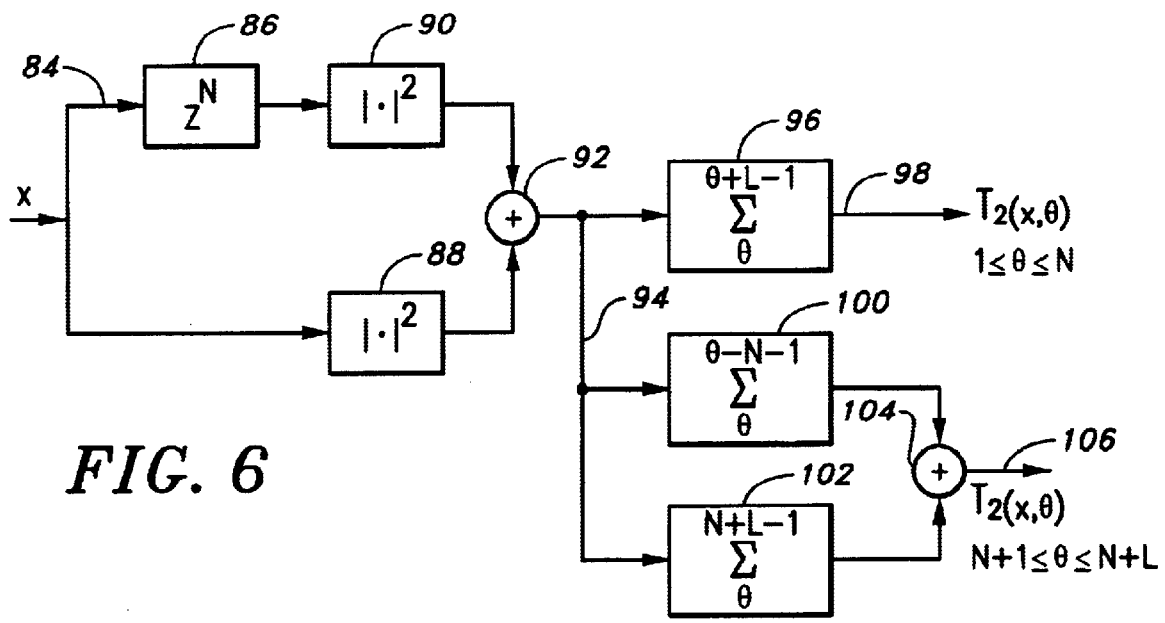
FIG. 6 is a block diagram representation of the $T_2$ function provided by the present invention.

With reference now to FIG. 6, a block diagram shows the processing of an observation vector x according to the present invention to generate the $T_2(x,\theta)$ function shown in block 38 of FIG. 4. Signal representing x are conducted on a path 84 to blocks 86, 88, 90 and summer 92 which perform the autocorrelation operation for the observation vector x as required by equation (18). The result is generated on a path 94 and conducted to a summation block 96 for summation over the interval $1 \leq \theta \leq N$ for output on a path 98 whereby the function $T_2(x,\theta)$ is generated for this interval.

The signal on path 94 is also conducted to blocks 100 and 102 where it similarly produces signals conducted to a summer 104 which generates on a path 106 for the function $T_2(x,\theta)$ for the interval $N+1 \leq \theta \leq N+L$.

The estimator proposed in the van de Beek, et al reference provides the Likelihood function of the observation vector over a finite range of timing offset parameter. Thus, the resultant ML estimator is sub-optimal and obtains the ML estimate by maximizing the conditional likelihood function $p(x,\epsilon,\theta | 1 \leq \theta \leq N)$.

Figure 7:
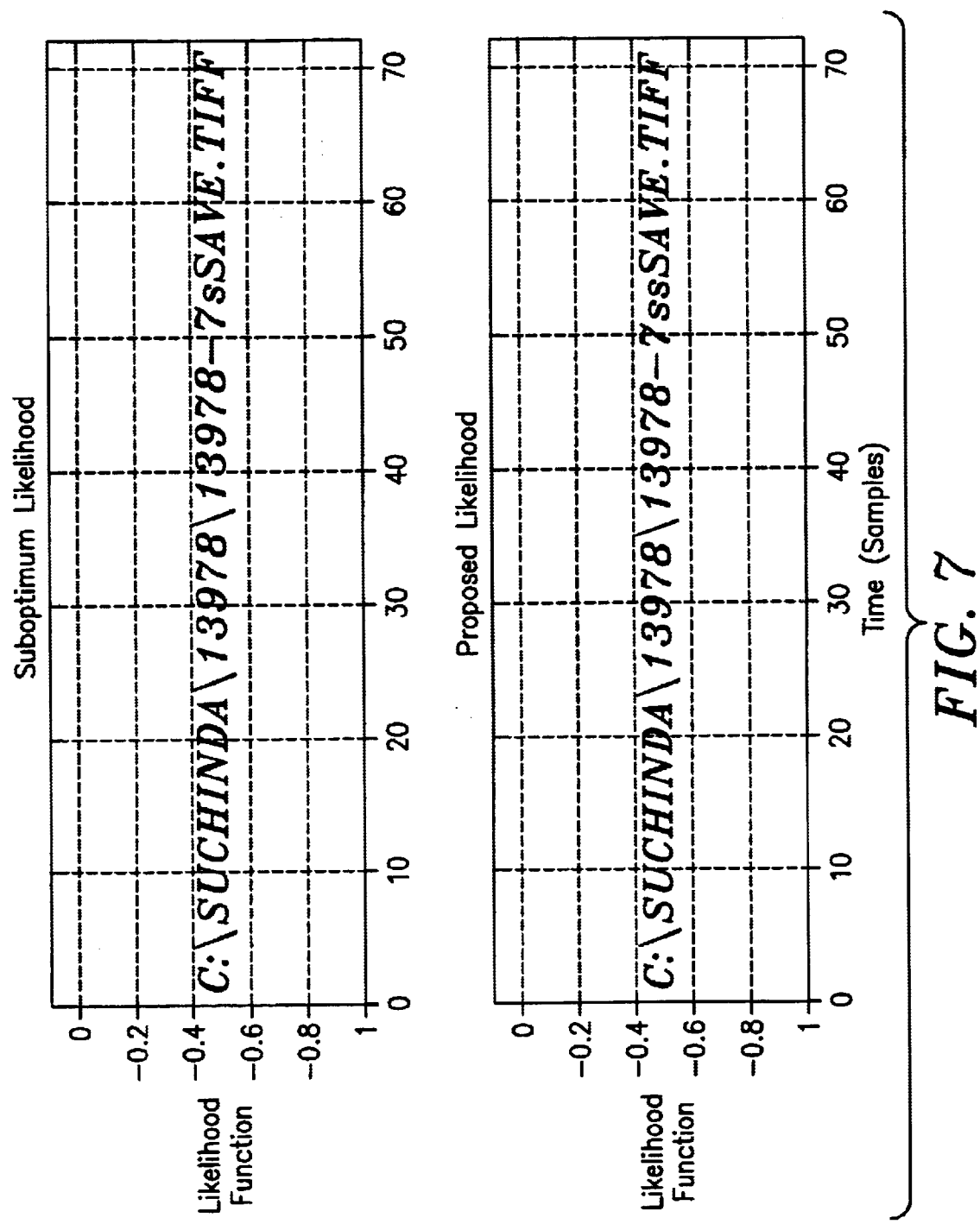
FIG. 7 is a graph comparing the computer simulations of the prior art ML estimation and the ML estimation of the present invention.

To better visualize this difference, a typical realization of the log-likelihood measures for both the prior art van de Beek et al ML estimation and the ML estimation of the present invention are plotted in FIG. 7 using a logarithmic scale on the vertical axis. In this simulation, the DFT block size (N) and CP (L) are assumed to be 64 and 8. Signal to noise ratio, frequency offset (ε) and timing offset (θ) are set to 25 dB, 0.01 and 70 samples respectively. The upper plot indicates the log-likelihood function for the sub-optimum metric proposed in van de Beek et al and the lower plot provides the metric given in equation (14). By investigating these plots, it is inferred that the sub-optimum metric achieves its maximum at θ=48. However, for the metric of the instant invention given in (14), the maximum is 70 which is exactly the unknown symbol timing error. Knowing the fact that during the startup and initialization of the receiver, symbol timing error is uniformly distributed between θ∈[1, N+L], the ML estimator proposed in van de Beek et al results in considerable estimation error with probability of L/(N+L).

Figure 8:
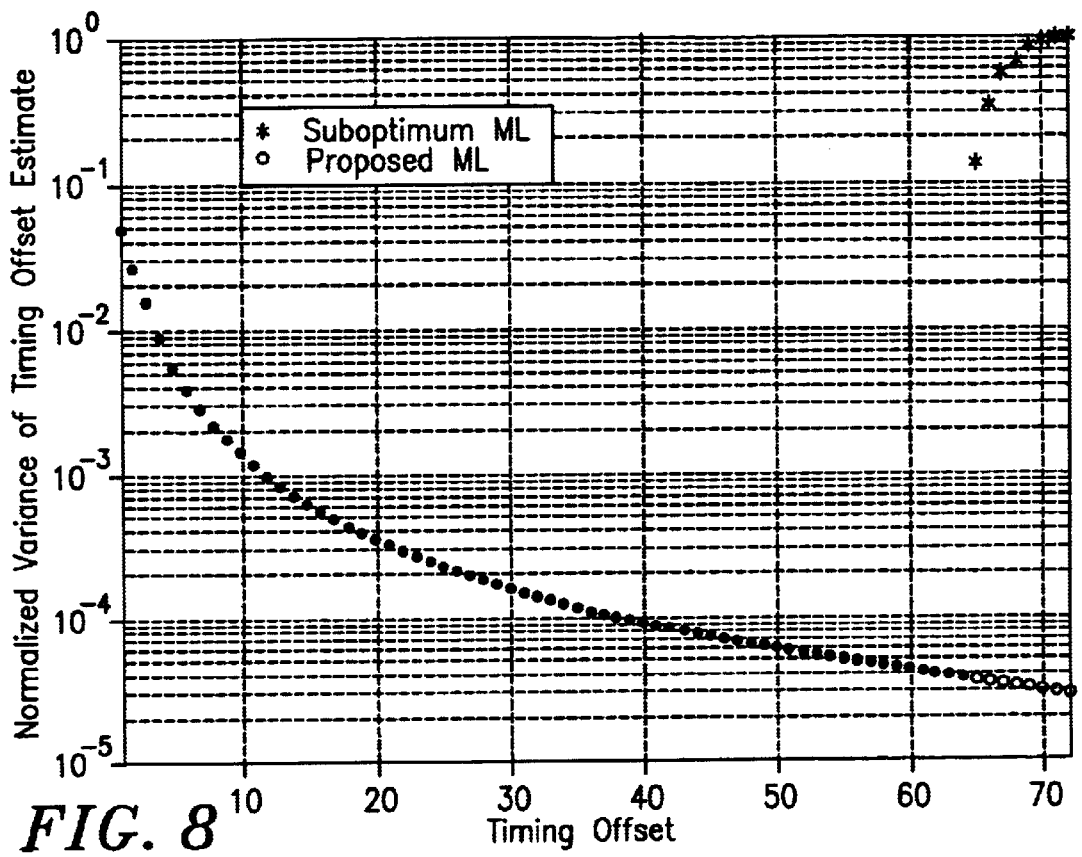
FIG. 8 is a graph comparing the prior art ML symbol timing offset estimator and the ML symbol timing offset estimation of the present invention.
Figure 9:
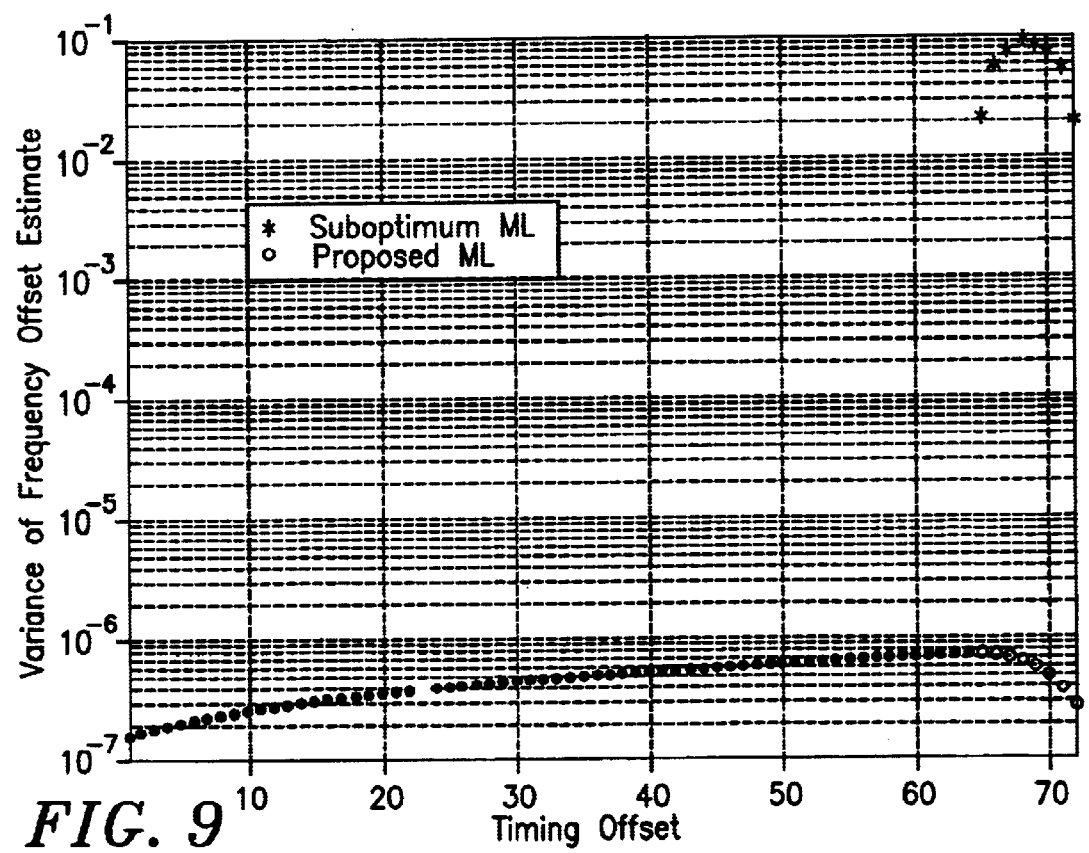
FIG. 9 is a graph comparing the prior art ML frequency offset estimator and the ML frequency offset estimation of the present invention.

Computer simulation is used to assess the performance of proposed estimator for synchronization of an OFDM system and the variance of estimator is chosen as a performance measure through the study. The simulation parameters used are typical of the OFDM digital audio broadcast (DAB) environment. More specifically, the chosen FFT size (N) for OFDM is 64. Unless specified, length of cyclic prefix (L), signal to noise ratio, and frequency offset are set to 8, 20 dB, and 0.01, respectively. A Monte Carlo simulation is used to evaluate the performance of the estimators of the present invention. In doing so, the performance of the ML estimator of instant invention is compared with that of the ML estimator given in van de Beek, et al over the range of timing offset parameter (θ∈[1, N+L]). (Since the estimation parameter, timing offset, is varying itself, a normalized variance $E[(\epsilon-\hat{\epsilon})^2/(\epsilon)^2]$ is used as a performance measure for the timing offset estimator.) FIGS. 8 and 9 compare the variance of the ML estimator of the instant invention against the prior art ML estimator. As expected, the prior art ML estimator exhibits analogous statistical behavior over the range of (θ∈[N+1, N+L]).

What is claimed is:

1. A method of estimating joint carrier frequency and symbol timing errors in a received sample bit stream including an observation vector (OV), having an observed carrier frequency timing offset θ, and a plurality of data-symbol frames, having an observed symbol timing error ε, comprising the steps of:

generating a probability density function (PDF) based on said OV; and generating from said PDF a joint maximum likelihood (ML) estimate of a joint carrier frequency offset and a symbol timing error, said maximization performed globally over the entire span of the estimation vector [ε,θ] and said ML estimate employed for blind synchronization of the received sample bit stream.

2. The joint carrier frequency and symbol timing error estimation method of claim 1 wherein said OV comprises an L-bit cyclic extension portion and a first and a second N-bit synchronization frame, and wherein said PDF comprises a first term, p1, based on said observed timing offset θ being with the span 1 to N and a second term, p2, based on said observed timing offset θ being within the span N+1 to N+L.

3. The joint carrier frequency and symbol timing error estimation method of claim 2 wherein said received bit stream has uncorrelated independent identically distributed random signal and noise sequence variables with power of $\sigma_s^2$ and $\sigma_n^2$, respectively, wherein said OV is denoted x, said PDF is given by $$p(x,\epsilon,\theta)=p_1(x,\epsilon,\theta)(U[\theta-1]-U[\theta-N-1])+p_2(x,\epsilon,\theta)(U[\theta-N-1]-U[\theta-N-L+1])$$

wherein U[n] is the discrete time unit step function, and wherein if $(1 \leq \theta \leq N)$ $$R = \begin{bmatrix} r_{xx}[0]I_{(\theta)} & 0 & 0 \\ 0 & T_{(N+L)} & 0 \\ 0 & 0 & r_{xx}[0]I_{(N-\theta)} \end{bmatrix}$$

-continued $$R^{-1} = \begin{bmatrix} \frac{I_{(\vartheta)}}{r_{xx}[0]} & 0 & 0 \\ 0 & T_{(N+L)}^{-1} & 0 \\ 0 & 0 & \frac{I_{(N-\vartheta)}}{r_{xx}[0]} \end{bmatrix}$$

$$T_M \stackrel{\Delta}{=} \text{Toeplitz}(r_{xx}[0]\ r_{xx}[1]\ \ldots\ r_{xx}[M-1])$$

$$r_{xx}[m] \stackrel{\Delta}{=} (\sigma_s^2 + \sigma_n^2)\delta[m] + \sigma_s^2 e^{-j2\pi\varepsilon}\delta[m-N]$$

$$T_{(M)}^{-1}[i, j] = \begin{cases} \frac{1}{r_{xx}[0](1-[a]^2)} & i = j\ \&(1 \le i \le M - N\ or\ N+1 \le i \le M) \\ \frac{-a^*}{r_{xx}[0](1-|a|^2)} & i - j = N \\ \frac{-a}{r_{xx}[0](1-|a|^2)} & j - i = N \\ \frac{1}{r_{xx}[0]} & i - j\ \&\ M - N + 1 \le i \le N \\ 0 & \text{otherwise} \end{cases}$$

where $a \stackrel{\Delta}{=} \frac{e^{-j2\pi\varepsilon} \sigma_s^2}{\sigma_s^2 + \sigma_n^2}$ $$P_1(x, \varepsilon, \vartheta) =$$

$$\frac{1}{(2\pi)^{2N+L} det(R)} \exp\left[\frac{-1}{2(\sigma_s^2 + \sigma_n^2)}\left(\sum_{k=0}^{2N+L-1} |x[k]|^2 + \sum_{k=\vartheta}^{L+\vartheta-1} (|x[k]|^2 + |x[k+N]|^2)\frac{[a]^2}{1-[a]^2} - 2\mathcal{R}\left\{\sum_{k=\vartheta}^{\vartheta+L-1} x^*[k]x[k+N]\frac{a^*}{1-|a|^2}\right\}\right)\right],$$

$$\varepsilon_{ML} = \frac{-1}{2\pi}\angle T_1(x, \vartheta),\ \text{where}$$

$$T_{1(x,\vartheta)} = \begin{cases} \sum_{k=\vartheta}^{L+\vartheta-1} x[k]x^*[k+N] & 1 \le \vartheta \le N \\ \sum_{k=0}^{\vartheta-N-1} x[k]x^*[k+N] + \sum_{k=\vartheta}^{N+L-1} x[k]x^*[k+N] & N+1 \le \vartheta \le N+L \end{cases}$$

and or
if $(N+1 \le \theta \le N+L)$ $$R = \begin{bmatrix} T_{(\vartheta)} & 0 \\ 0 & T_{(2N+L-\vartheta)} \end{bmatrix}$$

$$P_2(x, \varepsilon, \vartheta) =$$

$$\frac{1}{(2\pi)^{2N+L} det(R)} \exp\left[\frac{-1}{2(\sigma_s^2 + \sigma_n^2)}\left(\sum_{k=0}^{2N+L-1} |x[k]|^2 + \sum_{k=0}^{\vartheta+N-1} |x[k]|^2 + |x[k+N]|^2 + \sum_{k=\vartheta}^{N+L-1} |x[k]|^2 + |x[k+N]|^2\right)\frac{[a]^2}{1-|a|^2} - 2\mathcal{R}\left\{\sum_{k=0}^{\vartheta-N-1} x^*[k]x[k+N]\frac{a^*}{1-|a|^2}\right\} - 2\mathcal{R}\left\{\sum_{k=\vartheta}^{N+L-1} x^*[k]x[k+N]\frac{a^*}{1-|a|^2}\right\}\right)\right],$$

and
wherein said ML estimate of carrier frequency offset is given by $$\vartheta_{ML} = \operatorname*{argmax}_{\vartheta} T_2(\vartheta)|a| + 2|T_1(\vartheta)|$$

and wherein said ML estimate of symbol timing error is given by

-continued $$T_{2(x,\vartheta)} = \begin{cases} \sum_{k=\vartheta}^{L+\vartheta-1} |x[k]|^2 + |x[k+N]|^2 & 1 \leq \vartheta \leq N \\ \sum_{k=0}^{\vartheta-N-1} |x[k]|^2 + |x[k+N]|^2 + \sum_{k=\vartheta}^{N+L-1} |x[k]|^2 + |x[k+N]|^2 & N+1 \leq \vartheta \leq N+L \end{cases}$$

4. A method of synchronizing a received sample bit stream, comprising the steps of:
transmitting at a transmitter said bit stream including an observation vector (OV);
receiving and sampling at a receiver said bit stream, said sampled bit stream including, said OV with an observed carrier frequency timing offset θ, and a plurality of data-symbol frames, having an observed symbol timing error ϵ;
generating a probability density function (PDF) based on said OV;
generating from said PDF a joint maximum likelihood (ML) estimate of a joint carrier frequency offset and a symbol timing error, said maximization performed globally over the entire span of the estimation vector [ϵ,θ] and said ML estimate employed for blind synchronization of the received sample bit stream; and
synchronizing said received bit stream by said ML estimates of carrier frequency offset and symbol timing error.

5. The synchronization method of claim 4 wherein said OV comprises an L-bit cyclic extension portion and a first and a second N-bit synchronization frame, and wherein said PDF comprises a first term, p1, based on said observed timing offset θ being within the span 1 to N and a second term, p2, based on said observed timing offset θ being within the span N+1 to N+L.

6. The synchronization method of claim 5 wherein said received bit stream has uncorrelated independent identically distributed random signal and noise sequence variables with power of $\sigma_s^2$ and $\sigma_n^2$, respectively, wherein said OV is denoted x, said PDF is given by $$p(x,\epsilon,\theta) = p_1(x,\epsilon,\theta)(U[\theta-1] - U[\theta-N-1]) + p_2(x,\epsilon,\theta)(U[\theta-N-1] - U[\theta-N-L+1])$$

wherein U[n] is the discrete time unit step function, and wherein if $(1 \leq \theta \leq N)$ $$R = \begin{bmatrix} r_{xx}[0]I_{(\vartheta)} & 0 & 0 \\ 0 & T_{(N+L)} & 0 \\ 0 & 0 & r_{xx}[0]I_{(N-\vartheta)} \end{bmatrix}$$

$$R^{-1} = \begin{bmatrix} \dfrac{I_{(\vartheta)}}{r_{xx}[0]} & 0 & 0 \\ 0 & T_{(N+L)}^{-1} & 0 \\ 0 & 0 & \dfrac{I_{(N-\vartheta)}}{r_{xx}[0]} \end{bmatrix}$$

$$T_M \stackrel{\Delta}{=} \text{Toeplitz}(r_{xx}[0] \ r_{xx}[1] \ \ldots \ r_{xx}[M-1])$$

$$r_{xx}[m] \stackrel{\Delta}{=} (\sigma_s^2 + \sigma_n^2)\delta[m] + \sigma_s^2 e^{-j2\pi\epsilon}\delta[m-N]$$

$$T_M \stackrel{\Delta}{=} \text{Toeplitz}(r_{xx}[0] \ r_{xx}[1] \ \ldots \ r_{xx}[M-1])$$

$$r_{xx}[m] \stackrel{\Delta}{=} (\sigma_s^2 + \sigma_n^2)\delta[m] + \sigma_s^2 e^{-j2\pi\epsilon}\delta[m-N]$$

$$T_{(M)}^{-1}[i,j] = \begin{cases} \dfrac{1}{r_{xx}[0](1-[a]^2)} & i=j \ \& (1 \leq i \leq M-N \text{ or } N+1 \leq i \leq M) \\ \dfrac{-a^*}{r_{xx}[0](1-|a|^2)} & i-j=N \\ \dfrac{-a}{r_{xx}[0](1-|a|^2)} & j-i=N \\ \dfrac{1}{r_{xx}[0]} & i-j \ \& M-N+1 \leq i \leq N \\ 0 & \text{otherwise} \end{cases}$$

where $$a \stackrel{\Delta}{=} \dfrac{e^{-j2\pi\epsilon}\sigma_s^2}{\sigma_s^2 + \sigma_n^2}$$

-continued $$P_1(x, \varepsilon, \vartheta) = \frac{1}{(2\pi)^{2N+L} det(R)} \exp\left[\frac{-1}{2(\sigma_s^2 + \sigma_n^2)} \left(\sum_{k=0}^{2N+L-1} |x[k]|^2 + \sum_{k=\vartheta}^{L+\vartheta-1} (|x[k]|^2 + |x[k+N]|^2) \frac{[a]^2}{1-[a]^2} - 2R\left\{\sum_{k=\vartheta}^{L+\vartheta-1} x^*[k]x[k+N] \frac{a^*}{1-|a|^2}\right\}\right)\right], \text{ or}$$

if $(N+1 \leq \theta \leq N+L)$ $$R = \begin{bmatrix} T_{(\vartheta)} & 0 \\ 0 & T_{(2N+L-\vartheta)} \end{bmatrix}$$

$$P_2(x, \varepsilon, \vartheta) = \frac{1}{(2\pi)^{2N+L} det(R)} \exp\left[\frac{-1}{2(\sigma_s^2 + \sigma_n^2)} \left(\sum_{k=0}^{2N+L-1} |x[k]|^2 + \left(\sum_{k=0}^{\vartheta-N-1} |x[k]|^2 + |x[k+N]|^2 + \sum_{k=\vartheta}^{N+L-1} |x[k]|^2 + |x[k+N]|^2\right) \frac{[a]^2}{1-|a|^2} - 2R\left\{\sum_{k=0}^{\vartheta-N-1} x^*[k]x[k+N] \frac{a^*}{1-|a|^2}\right\} - 2R\left\{\sum_{k=\vartheta}^{N+L-1} x^*[k]x[k+N] \frac{a^*}{1-|a|^2}\right\}\right)\right],$$

and
wherein said ML estimate of carrier frequency offset is given by $$\vartheta_{ML} = \arg\max_{\vartheta} T_2(\vartheta)|a| + 2|T_1(\vartheta)|$$

$$\varepsilon_{ML} = \frac{-1}{2\pi} \angle T_1(x, \vartheta),$$ where and wherein said ML estimate of symbol timing error is given by $$T_{1(\chi,\vartheta)} = \begin{cases} \sum_{k=\vartheta}^{L+\vartheta-1} x[k]x^*[k+N] & 1 \leq \vartheta \leq N \\ \sum_{k=0}^{\vartheta-N-1} x[k]x^*[k+N] + \sum_{k=\vartheta}^{N+L-1} x[k]x^*[k+N] & N+1 \leq \vartheta \leq N+L \end{cases}$$

and $$T_2(\chi, \vartheta) = \begin{cases} \sum_{k=\vartheta}^{L+\vartheta-1} |x[k]|^2 + |x[k+N]|^2 & 1 \leq \vartheta \leq N \\ \sum_{k=0}^{\vartheta-N-1} |x[k]|^2 + |x[k+N]|^2 + \sum_{k=\vartheta}^{N+L-1} |x[k]|^2 + |x[k+N]|^2 & N+1 \leq \vartheta \leq N+L \end{cases}.$$

7. A method of estimating joint carrier frequency and symbol timing errors in a received sample bit stream including an observation vector (OV), having an observed carrier frequency timing offset θ, and a plurality of data-symbol frames, having an observed symbol timing error ε, comprising the steps of:

generating a probability density function (PDF) based on said OV; and generating from said PDF a joint maximum likelihood (ML) estimate of a joint carrier frequency offset and a symbol timing error, said maximization performed globally over the entire span of the estimation vector [ε,θ], wherein said OV comprises an L-bit cyclic extension portion and a first and a second N-bit synchronization frame, and wherein said PDF comprises a first term, p1, based on said observed timing offset θ being within the span 1 to N and a second term, p2, based on said observed timing offset θ being within the span N+1 to N+L, and wherein said received bit stream has uncorrelated independent identically distributed random signal and noise sequence variables with power of $\sigma_s^2$ and $\sigma_n^2$, respectively, wherein said OV is denoted x, said PDF is given by $$p(x,\epsilon,\theta)=p_1(x,\epsilon,\theta)(U[\theta-1]-U[\theta-N-1])+p_2(x,\epsilon,\theta)(U[\theta-N-1]-U[\theta-N-L+1])$$

wherein U[n] is the discrete time unit step function, and wherein if ($1 \leq \theta \leq N$)

$$R = \begin{bmatrix} r_{xx}[0]I_{(\vartheta)} & 0 & 0 \\ 0 & T_{(N+L)} & 0 \\ 0 & 0 & r_{xx}[0]I_{(N-\vartheta)} \end{bmatrix}$$

$$R^{-1} = \begin{bmatrix} \frac{I_{(\vartheta)}}{r_{xx}[0]} & 0 & 0 \\ 0 & T_{(N+L)}^{-1} & 0 \\ 0 & 0 & \frac{I_{(N-\vartheta)}}{r_{xx}[0]} \end{bmatrix}$$

$T_M \triangleq \text{Toeplitz}(r_{xx}[0]\, r_{xx}[1] \ldots r_{xx}[M-1]$ $r_{xx}[m] = \triangleq (\sigma_s^2 + \sigma_n^2)\delta[m] + \sigma_s^2 e^{-j2\pi\epsilon}\delta[m-N]$ $$T_{(M)}^{-1}[i,j] = \begin{cases} \frac{1}{r_{ss}[0](1-[a]^2)} & i = j \,\&\, (1 \leq i \leq M - N \text{ or } N+1 \leq i \leq M) \\ \frac{-a^*}{r_{ss}[0](1-|a|^2)} & i - j = N \\ \frac{-a}{r_{ss}[0](1-|a|^2)} & j - i = N \\ \frac{1}{r_{ss}[0]} & i - j \,\&\, M - N + 1 \leq i \leq N \\ 0 & \text{otherwise} \end{cases}$$

where $\quad a \triangleq \dfrac{e^{-j2\pi\epsilon}\sigma_s^2}{\sigma_s^2 + \sigma_n^2}$ -continued $$P_1(x,\varepsilon,\vartheta) = \frac{1}{(2\pi)^{2N+L}\det(R)} \exp\left[\frac{-1}{2(\sigma_s^2+\sigma_n^2)}\left(\sum_{k=0}^{2N+L-1}|x[k]|^2 + \sum_{k=\vartheta}^{L+\vartheta-1}(|x[k]|^2+|x[k+N]|^2)\frac{[a]^2}{1-[a]^2} - 2\mathcal{R}\left\{\sum_{k=\vartheta}^{\vartheta+L-1}x^*[k]x[k+N]\frac{a^*}{1-|a|^2}\right\}\right)\right]$, or if ($N+1 \leq \theta \leq N+L$)

$$R = \begin{bmatrix} T_{(\vartheta)} & 0 \\ 0 & T_{(2N+L-\vartheta)} \end{bmatrix}$$

$$P_2(x,\varepsilon,\vartheta) = \frac{1}{(2\pi)^{2N+L}\det(R)} \exp\left[\frac{-1}{2(\sigma_s^2+\sigma_n^2)}\left(\sum_{k=0}^{2N+L-1}|x[k]|^2 + \left(\sum_{k=0}^{\vartheta-N-1}|x[k]|^2+|x[k+N]|^2 + \sum_{k=\vartheta}^{N+L-1}|x[k]|^2 + |x[k+N]|^2\right)\frac{[a]^2}{1-[a]^2} - 2\mathcal{R}\left\{\sum_{k=0}^{\vartheta-N-1}x^*[k]x[k+N]\frac{a^*}{1-|a|^2}\right\} - 2\mathcal{R}\left\{\sum_{k=\vartheta}^{N+L-1}x^*[k]x[k+N]\frac{a^*}{1-|a|^2}\right\}\right)\right]$$, and wherein said ML estimate of carrier frequency offset is given by $\vartheta_{ML} = \arg\max_\vartheta T_2(\vartheta)|a| + 2|T_1(\vartheta)|$ and wherein said ML estimate of symbol timing error is given by $\varepsilon_{ML} = \dfrac{-1}{2\pi} \angle T_1(x,\vartheta)$, where $$T_{1(\chi,\vartheta)} = \begin{cases} \sum_{k=\vartheta}^{L+\vartheta-1} x[k]x^*[k+N] & 1 \leq \vartheta \leq N \\ \sum_{k=0}^{\vartheta-N-1} x[k]x^*[k+N] + \sum_{k=\vartheta}^{N+L-1} x[k]x^*[k+N] & N+1 \leq \vartheta \leq N+L \end{cases}$$

and $$T_2(\chi,\vartheta) = \begin{cases} \sum_{k=\vartheta}^{L+\vartheta-1} |x[k]|^2 + |x[k+N]|^2 & 1 \leq \vartheta \leq N \\ \sum_{k=0}^{\vartheta-N-1} |x[k]|^2 + |x[k+N]|^2 + \sum_{k=\vartheta}^{N+L-1} |x[k]|^2 + |x[k+N]|^2 & N+1 \leq \vartheta \leq N+L \end{cases}$$

8. A method of synchronizing a received sample bit stream, comprising the steps of:
transmitting at a transmitter said bit stream including an observation vector (OV);
receiving and sampling at a receiver said bit stream, said sampled bit stream including, said OV with an observed carrier frequency timing offset θ, and a plurality of data-symbol frames, having an observed symbol timing error ε;
generating a probability density function (PDF) based on said OV;
generating from said PDF a joint maximum likelihood (ML) estimate of a joint carrier frequency offset and a symbol timing error, said maximization performed globally over the entire span of the estimation vector [ε,θ]; and synchronizing said received bit stream by said ML estimates of carrier frequency offset and symbol timing error, wherein said OV comprises an L-bit cyclic extension portion and a first and a second N-bit synchronization frame, and wherein said PDF comprises a first term, p1, based on said observed timing offset θ being within the span 1 to N and a second term, p2, based on said observed timing offset θ being within the span N+1 to N+L, and wherein said received bit stream has uncorrelated independent identically distributed random signal and noise sequence variables with power of $\sigma_s^2$ and $\sigma_n^2$, respectively, wherein said OV is denoted x, said PDF is given by $$p(x,\epsilon,\theta)=p_1(x,\epsilon,\theta)(U[\theta-1]-U[\theta-N-1])+p_2(x,\epsilon,\theta)(U[\theta-N-1]-U[\theta-N-L+1])$$

wherein U[n] is the discrete time unit step function, and wherein if $(1 \leq \theta \leq N)$ $$R = \begin{bmatrix} r_{xx}[0]I_{(\theta)} & 0 & 0 \\ 0 & T_{(N+L)} & 0 \\ 0 & 0 & r_{xx}[0]I_{(N-\theta)} \end{bmatrix}$$

$$R^{-1} = \begin{bmatrix} \frac{I_{(\theta)}}{r_{xx}[0]} & 0 & 0 \\ 0 & T_{(N+L)}^{-1} & 0 \\ 0 & 0 & \frac{I_{(N-\theta)}}{r_{xx}[0]} \end{bmatrix}$$

$$T_M \triangleq \text{Toeplitz}(r_{xx}[0]\ r_{xx}[1]\ \ldots\ r_{xx}[M-1])$$

$$r_{xx}[m] \triangleq (\sigma_s^2 + \sigma_n^2)\delta[m] + \sigma_s^2 e^{-j2\pi\epsilon}\delta[m-N]$$

$$T_{(M)}^{-1}[i,j] = \begin{cases} \frac{1}{r_{ss}[0](1-[a]^2)} & i=j\ \&(1 \leq i \leq M-N\ \text{or}\ N+1 \leq i \leq M) \\ \frac{-a^*}{r_{ss}[0](1-|a|^2)} & i-j=N \\ \frac{-a}{r_{ss}[0](1-|a|^2)} & j-i=N \\ \frac{1}{r_{ss}[0]} & i-j\ \&\ M-N+1 \leq i \leq N \\ 0 & \text{otherwise} \end{cases}$$

-continued where $a \triangleq \dfrac{e^{-j2\pi\epsilon}\sigma_s^2}{\sigma_s^2 + \sigma_n^2}$ $$P_1(x,\epsilon,\vartheta) = \frac{1}{(2\pi)^{2N+L}det(R)}\exp\Bigg[\frac{-1}{2(\sigma_s^2+\sigma_n^2)}\Bigg(\sum_{k=0}^{2N+L-1}|x[k]|^2 + \sum_{k=\vartheta}^{L+\vartheta-1}(|x[k]|^2+|x[k+N]|^2)\frac{[a]^2}{1-[a]^2} - 2\text{R}\Bigg\{\sum_{k=\vartheta}^{\vartheta+L-1}x^*[k]x[k+N]\frac{a^*}{1-|a|^2}\Bigg\}\Bigg)\Bigg]$$, or if $(N+1 \leq \theta \leq N+L)$ $$R = \begin{bmatrix} T_{(\vartheta)} & 0 \\ 0 & T_{(2N+L-\vartheta)} \end{bmatrix}$$

$$P_2(x,\epsilon,\vartheta) = \frac{1}{(2\pi)^{2N+L}det(R)}\exp\Bigg[\frac{-1}{2(\sigma_s^2+\sigma_n^2)}\Bigg(\sum_{k=0}^{2N+L-1}|x[k]|^2 + \Bigg(\sum_{k=0}^{\vartheta-N-1}|x[k]|^2+|x[k+N]|^2 + \sum_{k=\vartheta}^{N+L-1}|x[k]|^2 + |x[k+N]|^2\Bigg)\frac{[a]^2}{1-[a]^2} - 2\text{R}\Bigg\{\sum_{k=0}^{\vartheta-N-1}x^*[k]x[k+N]\frac{a^*}{1-|a|^2}\Bigg\} - 2\text{R}\Bigg\{\sum_{k=\vartheta}^{N+L-1}x^*[k]x[k+N]\frac{a^*}{1-|a|^2}\Bigg\}\Bigg)\Bigg]$$, and wherein said ML estimate of carrier frequency offset is given by $$\vartheta_{ML} = \arg\max_{\vartheta} T_2(\vartheta)|a| + 2|T_1(\vartheta)|$$

and wherein said ML estimate of symbol timing error is given by $$\epsilon_{ML} = \frac{-1}{2\pi}\angle T_{1(\chi,\vartheta)} \begin{cases} \sum_{k=\vartheta}^{L+\vartheta-1}x[k]x^*[k+N] & 1 \leq \vartheta \leq N \\ \sum_{k=0}^{\vartheta-N-1}x[k]x^*[k+N] + \sum_{k=\vartheta}^{N+L-1}x[k]x^*[k+N] & N+1 \leq \vartheta \leq N+L \end{cases}$$

and $$T_2(\chi,\vartheta) = \begin{cases} \sum_{k=\vartheta}^{L+\vartheta-1}|x[k]|^2+|x[k+N]|^2 & 1 \leq \vartheta \leq N \\ \sum_{k=0}^{\vartheta-N-1}|x[k]|^2+|x[k+N]|^2 + \sum_{k=\vartheta}^{N+L-1}|x[k]|^2+|x[k+N]|^2 & N+1 \leq \vartheta \leq N+L \end{cases}$$

\* \* \* \* \*

UNITED STATES PATENT AND TRADEMARK OFFICE
CERTIFICATE OF CORRECTION

PATENT NO. : 6,678,339 B1
DATED : January 13, 2004
INVENTOR(S) : Navid Lashkarin It is certified that error appears in the above-identified patent and that said Letters Patent is hereby corrected as shown below:

Column 3,
Lines 6, 8, 21, 55 and 63, replace "$\theta$" with -- $f$ --.
Line 17 replace all "$\theta$" with -- $f$ --.
Line 50, replace "$\omega\pi$" with -- $\pi\varepsilon$ --
Line 50, replace "j" with -- s --
Line 65, replace "(s)" with -- $f$ --.

Column 4,
Line 17, replace "$_{M1}$" with -- $_{ML}$ --
Line 23, replace ""$_{M1}$" with -- $_{ML}$ --
Lines 54, 58, 65 and 66, replace "$\theta$" with -- $f$ --

Column 5,
Line 9 and 14, replace "$\theta$" with -- $f$ --

Column 8,
Lines 55, 65 and 66, replace "$\theta$" with -- $f$ --

Column 9,
Lines 4, 37, 38 and 49, replace "$\theta$" with -- $f$ --.
Line 20, replace "$f$" with -- $\varepsilon$ --
Line 45, replace "mc" with -- $\pi\varepsilon$ --
Line 49, replace "$\theta$" with -- $f$ --

Column 10,
Lines 20 and 22, replace "$\theta$" with -- $f$ --
Line 61, replace "-j2$\pi$" with -- j2 $\pi\varepsilon$ --

Column 11,
Line 66, replace "$\theta$" with -- $f$ --

Column 12,
Lines 19, 29, 31, 56, 57 and 66, replace "$\theta$" with -- $f$ --
Line 20, replace all "$\theta$" with -- $f$ --
Lines 38 and 40, replace "$\zeta$" with -- $\chi$ --

UNITED STATES PATENT AND TRADEMARK OFFICE
CERTIFICATE OF CORRECTION

PATENT NO. : 6,678,339 B1
DATED : January 13, 2004
INVENTOR(S) : Navid Lashkarin It is certified that error appears in the above-identified patent and that said Letters Patent is hereby corrected as shown below:

Column 13,
Lines 3, 6, 7, 12, 19, 20, 24, 27 and 34, replace "θ" with -- $\phi$ --
Lines 35, 40, 46, 54, 60 and 64, replace "θ" with -- $\phi$ --

Column 14,
Lines 15, 23, 27, 37, 44, 46, 56 and 61, replace "θ" with -- $\phi$ --

Column 15,
Line 40, replace "θ" with -- $\phi$ --

Column 17,
Lines 16, 25, 35 and 36, replace "θ" with -- $\phi$ --

Column 18,
Line 16, replace "θ" with -- $\phi$ --

Column 20,
Lines 41, 49, 53 and 55, replace "θ" with -- $\phi$ --
Line 64, replace "θ" with -- $\phi$ --

Column 22,
Lines 11, 59 and 66, replace "θ" with -- $\phi$ --

Column 23,
Lines 7, 9, 15 and 17, replace "θ" with -- $\phi$ --
Lines 15-17, correct line spacing Signed and Sealed this Third Day of August, 2004

JON W. DUDAS
*Acting Director of the United States Patent and Trademark Office*